May 24, 1966 P. F. DOEING 3,253,129

MARKET RESEARCH APPARATUS

Filed Dec. 20, 1962 5 Sheets-Sheet 1

INVENTOR.
Paul Francis Doeing

May 24, 1966 P. F. DOEING 3,253,129
MARKET RESEARCH APPARATUS
Filed Dec. 20, 1962 5 Sheets-Sheet 2
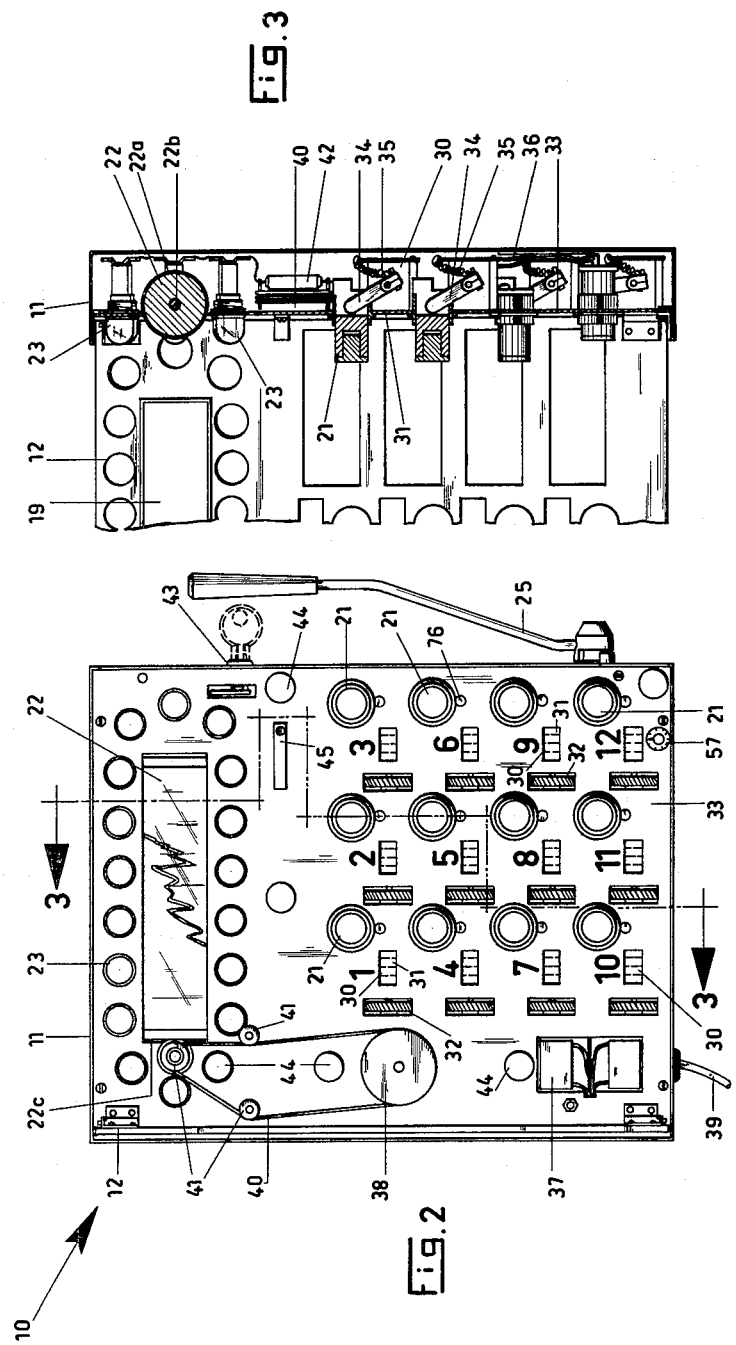
INVENTOR.
Paul Francis Doeing May 24, 1966   P. F. DOEING   3,253,129

MARKET RESEARCH APPARATUS

Filed Dec. 20, 1962   5 Sheets-Sheet 3

INVENTOR.
Paul Francis Doeing

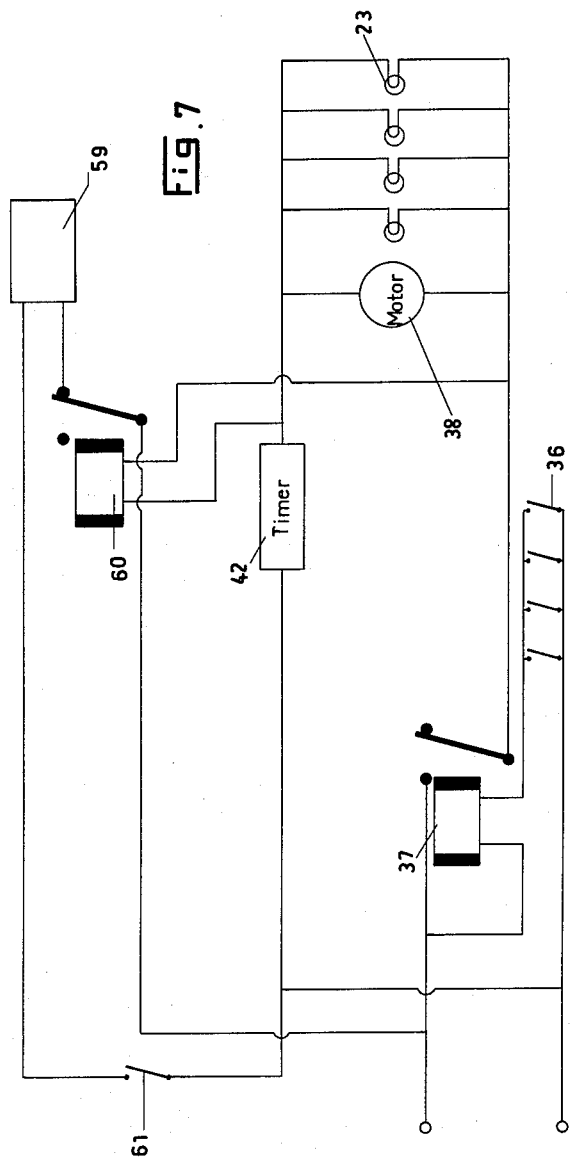

May 24, 1966  P. F. DOEING  3,253,129
MARKET RESEARCH APPARATUS
Filed Dec. 20, 1962  5 Sheets-Sheet 5
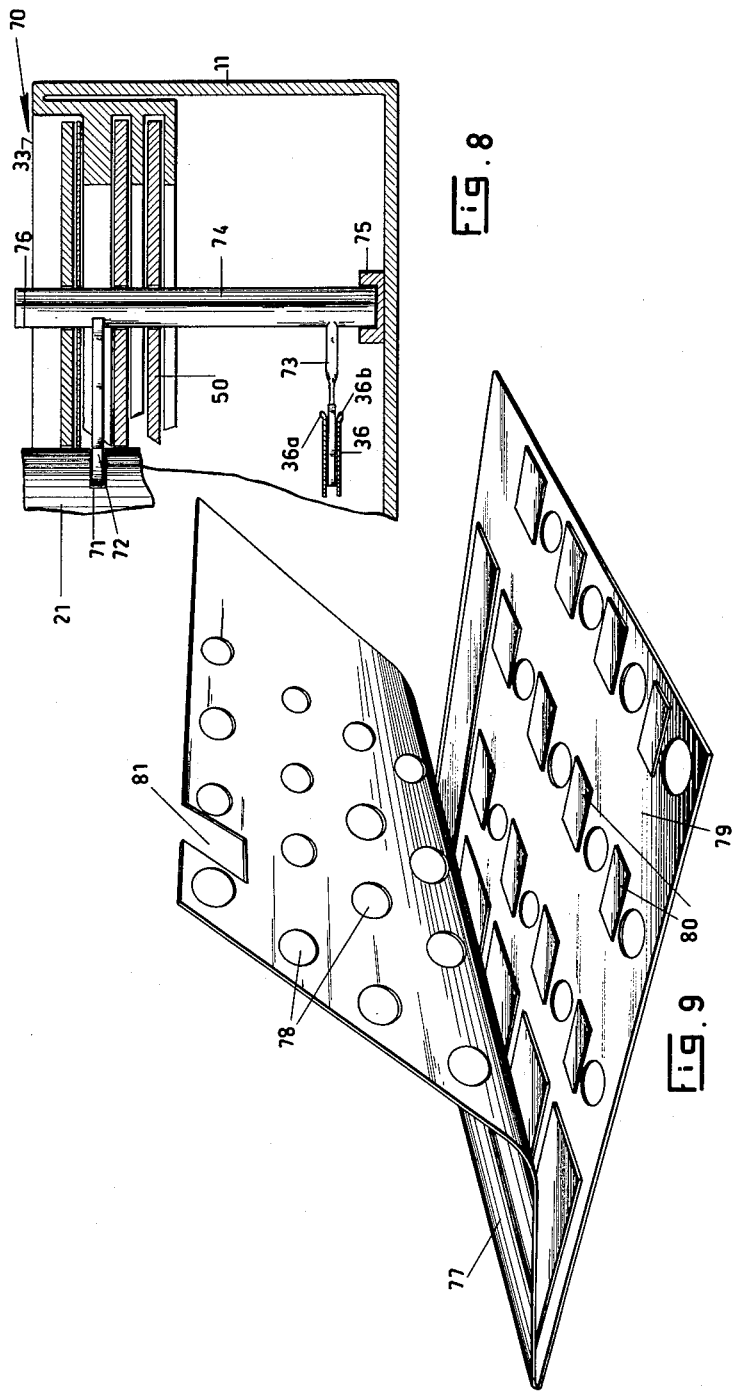
INVENTOR.
Paul Francis Doeing

United States Patent Office 3,253,129
Patented May 24, 1966

3,253,129
MARKET RESEARCH APPARATUS
Paul Francis Doeing, 588 Breckenridge St., Buffalo, N.Y.
Filed Dec. 20, 1962, Ser. No. 246,246
7 Claims. (Cl. 235—92)

This invention relates to improvements in polling devices and more particularly to improvements in market research machines.

In market research it is conventional practice to conduct a survey by canvassing a large number of persons, asking them various pertinent questions concerning a particular product or service, recording their answer and subsequently tabulating the results. This is a costly and time consuming method and is often beyond the means of small businessmen, many of whom would benefit considerably if they could be made aware of public opinion regarding their products or services.

Machines have been developed to automatically record votes and the like, and these could be adapted to use in a market survey, but they have the disadvantage that they are complicated and extremely expensive and are also fairly bulky. Other machines of the prior art are adapted to record results by means of appropriately positioned holes being punched in cards, these punched cards being thereafter machine sorted and classified, the disadvantages again being that their mechanisms are fairly complex and a second machine is required to sort, count and tabulate.

It is, therefore, a primary object of the instant invention to provide a market research machine which will permit a public opinion survey to be made at low cost.

Another object of the invention is to provide a market research machine which will permit the results of a survey to be instantly available.

A further object of the present invention is to provide a market research machine having simple, direct recording mechanisms, thereby eliminating the use of extra counting and tabulating machines.

Yet another object of the invention is to provide a market research machine which will provide sufficient time for the interviewee to read and study the question prior to answering, and then will allow only one answer to each question to be made.

Still a further object of the invention is to provide a market research machine which will permit an interviewee time to answer all the questions and then becomes locked until selected by another person. Furthermore the time allowed may be changed by the operator to suit each individual survey.

Another object of the present invention is to provide a market research machine in which the questionnaire may be easily changed for conducting different types of survey in succession.

Another object of the invention is to provide a market research machine which, when using questionnaires requiring only a limited number of questions or answers thereto, will permit the unused spaces and push buttons to be blocked out in order to prevent inadvertent use and to preserve the appearance of the machine.

A further object of the invention is to provide a market research machine having a retractable poster frame in order to provide space for announcements, advertising and the like.

Yet a further object of the invention is to provide a market research machine which is compact enough for easy transportation and storage.

Still another object of the invention is to provide a market research machine having an appearance adapted to attract attention.

Yet another object of the invention is to provide a market research machine which may be used in locations where there is no electrical power available, the necessary batteries for the electrical portion of the operation being contained in the machine, and the resetting action by the user, being adapted, through a small generator, to recharge the batteries at each operation thereof.

These and other objects and features of the invention will become apparent when taken in conjunction with the following description and drawings in which:

FIG. 2 is a plan view of the machine, showing the lid removed and exposed the counting mechanism.

FIG. 3 is a sectional side elevation of th e machine shown in FIG. 2 taken on the line 3—3, the lid still being open.

FIG. 7 is a wiring diagram of the invention.

FIG. 8 is a fractional, sectional end elevation of the invention showing particularly the mechanism utilized in locking a push button in its fully depressed state while, at the same time, holding the relevant switch contacts apart.

FIG. 9 is a perspective view of a questionnaire sheet and a blocking out sheet as embodied in the invention.

Figure 1:
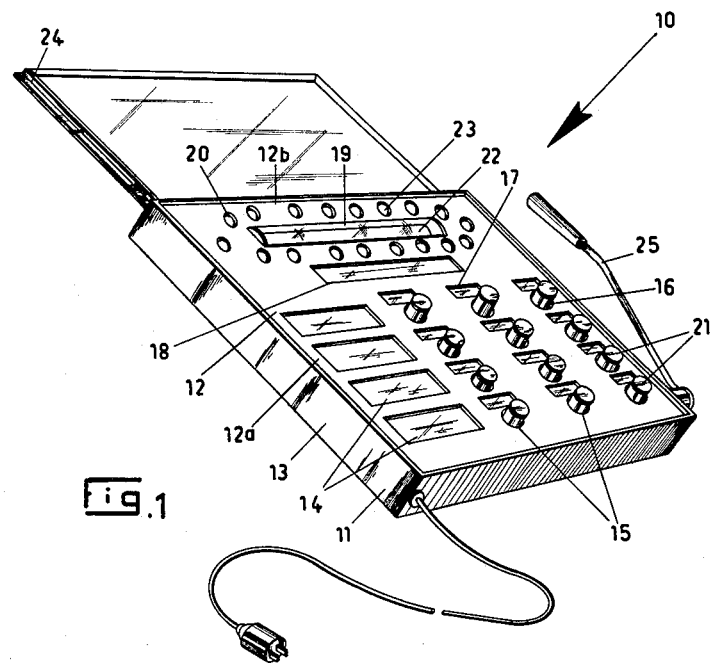
FIG. 1 is a perspective view of a market research machine embodying the present invention.

Referring to FIG. 1, a market research machine 10 includes a substantially flat, rectangular, outer casing 11 having a lid 12 hingedly attached to one side 13 of casing 11.

A plurality of large rectangular apertures 14 are formed through lid 12 and are preferably arranged in a vertical column adjacent to and parallel with the hinged edge 12a of lid 12.

A plurality of substantially circular holes 15 are also formed through lid 12, arranged in horizontal rows 16, each row 16, extending transversely of lid 12 in horizontal alignment with aperture 14, and corresponding holes 15 of each row 16 being in vertical, columnar arrangement.

A similar plurality of small rectangular apertures 17 are also formed through lid 12, each aperture 17 being adjacent to and in similar alignment with holes 15.

It should be noted that in the foregoing description the term "vertical" is used to denote lines parallel with edge 12a of lid 12 and other directional terms are relative thereto.

Two other elongated rectangular apertures 18 and 19 are formed transversely through lid 12, aperture 18 being located adjacent to and slightly above the uppermost row of smaller apertures 17, while aperture 19 is substantially equally spaced apart from the upper edge of aperture 18 and the upper edge 12b of lid 12.

Aperture 19 is ringed by a plurality of holes 20.

In use, a survey sheet (not shown on this drawing) is assembled under lid 12, a plurality of pertinent questions being printed thereon and adapted to be viewed through apertures 14. Multiple choice answers to these questions are also printed on the survey sheet, each of said answers being exposed through an aperture 17 in transverse alignment with its particular question. The survey sheet is perforated to permit its alignment with holes 15 and a push button 21 extends through each hole 15 so that an interviewee may read a question through an aperture 14, select an answer from those visible through the adjacent row of apertures 17 and then push the appropriate button 21.

Aperture 18 provides a window through which instructions, titles or any other information printed on the survey sheet may be displayed. A continuously rotating, cylindrical type graph 22 is visible through aperture 19 while holes 20 permit a plurality of indicator lamps 23 to be seen through lid 12.

A rectangular frame 24 is retractably attached to casing 11 and is suitably adapted to carry a card or the like upon which announcements, advertising or similar messages may be inscribed.

Figure 5:
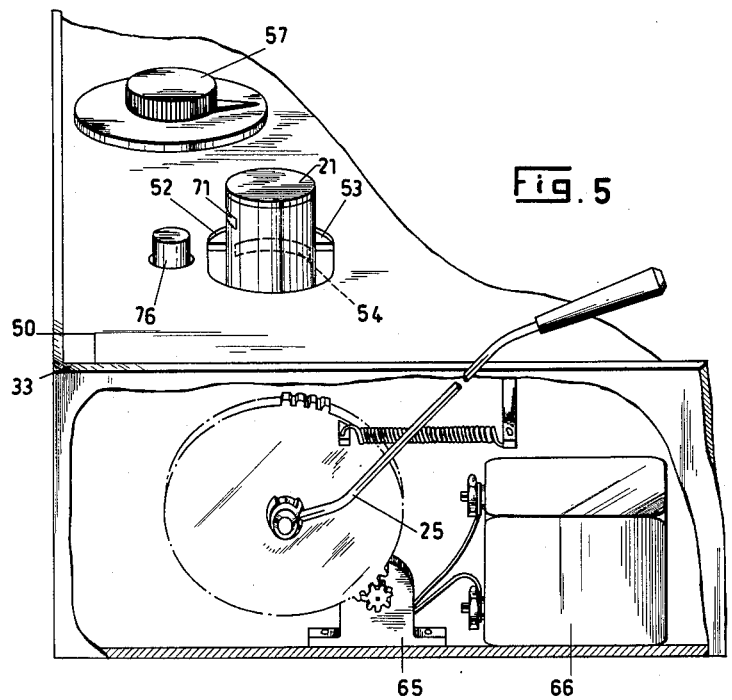
FIG. 5 is an enlarged, part cut away persective view of the portion of the machine including the selector handle and its associated mechanism.
Figure 6:
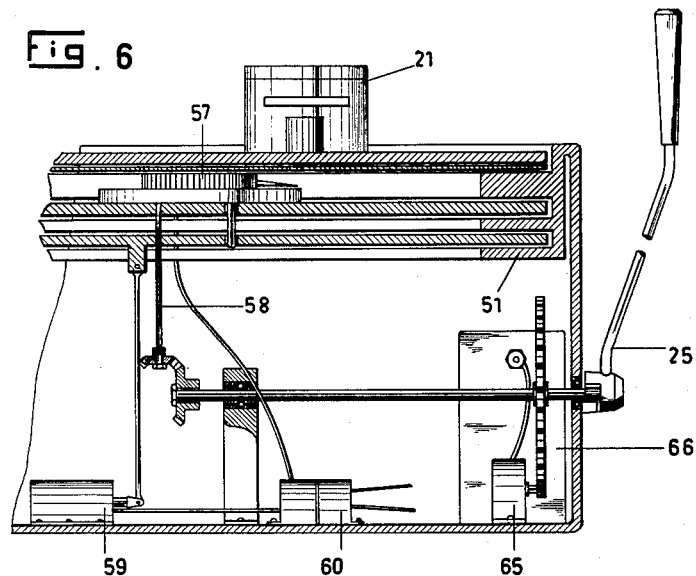
FIG. 6 is a sectional end elevation of the mechanism of FIG. 5 taken on line 6—6.

A selector handle 25 is preferably located on the right hand side of casing 11, being pivotally attached thereto and adapted to be moved arcuately through approximately 70 degrees in a vertical plane, the operation thereof being fully described with FIGS. 5 and 6.

Referring to FIGS. 2 and 3, the general layout of the recording mechanism is shown in which each push button 21 is utilized to operate a mechanical counting device 30 in the usual manner. Devices 30 are conventional, each having a viewing window 31 and a reset wheel 32, and are attached to the underside of a retaining plate 33, by suitable screw means or the like, plate 33 being suitably apertured to permit buttons 21 and reset wheels 32 to extend freely therethrough and to expose windows 31 to view.

The operating levers 34 for counting devices 30 each have a spring 35 to assist their return to their normal positions and to ensure buttons 21 return to their fully extended positions. Upon being depressed, each button 21 also closes a small contact switch 36 which activates a relay 37 which in turn places an electric motor 38 and indicator lamps 23 in a closed electrical circuit. The layout as shown in FIG. 7 illustrates this circuit in diagrammatic form, power for the circuit being obtained either externally by means of a lead in cable 39 as shown in FIG. 3 or as part of a built in battery circuit, as described with FIGS. 4, 5 and 6.

Graph 22 is intended as an eye-catching device and comprises a cylinder 22a supported by a spindle 22b which in turn is rotatably supported by retaining plate 33.

Graph 22 is freely rotatable in aperture 19, plate 33 also being apertured to permit graph 22 to extend below the lower surface thereof and to be housed within case 11.

At least one end wall 22c of graph 22 is in disc formation and is in pressural contact with a rubber or resilient plastic drive belt 40. Belt 40 is driven by motor 38 and is maintained in close parallel adjacency with the upper surface of plate 33 by a plurality of guide pulleys 41, one of which is located sufficiently close to end wall 22c to ensure belt 40 is maintained in frictional contact with said end wall 22c. The portion of belt 40 in contact with end wall 22c is located above the spindle 22b and adjacent the periphery of the end wall so that linear movement of belt 40 is thereby translated into rotational movement of the graph 22.

Graph 22 itself is tubular, with any appropriate design inscribed on the outer surface, and is a close sliding fit over cylinder 22a. Coincidental with graph 22 rotating, indicator lamps 23 are illuminated.

A conventional timing device, such as that shown at 42, is included in the circuit and is adapted to hold the motor 38 and lamps 23 in a closed circuit for a definite length of time, such as, for instance, 10 seconds, even though pressure is released from the push button 21 which initiated the operation.

Other devices may be included in the circuit, such as progressive flashers and the like, to produce a desired effect with lamps 23.

A locking device 43 located in outer case 11 is adapted to lock lid 12 in its closed position to prevent unauthorized tampering with the mechanism of machine 10, while a number of rubber stops 44 and a leaf spring 45 ensures that lid 12 is able to be a close fit within the upper end of case 11, without excessive play therein, and partly opening upon device 43 being unlocked.

Figure 4:
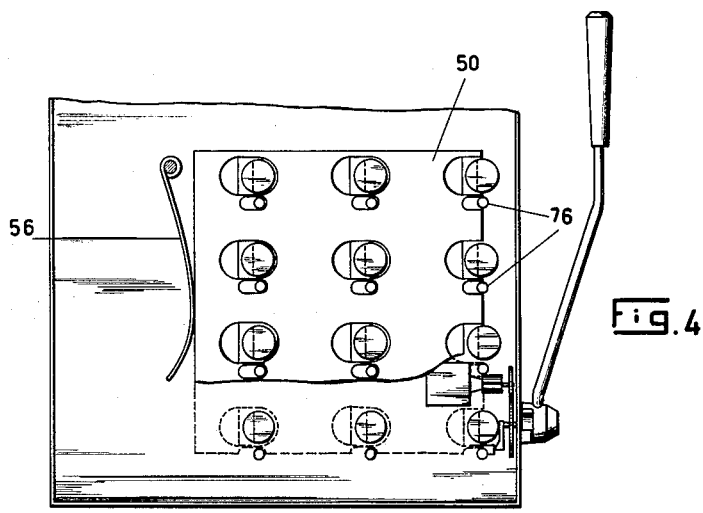
FIG. 4 is a fractional, part cut away, plan view of the machine.

FIGS. 4, 5 and 6 illustrate a safety mechanism which ensures that a definite pause must be made between answering successive questions and also prevents the depression of two or more push buttons 21, in rapid succession. This substantially reduces the danger of inadvertently answering the same question twice, thereby making the survey as accurate as possible.

This safety mechanism includes a locking plate 50 held in slidable, surface to surface contact with the underside of retaining plate 33 by conventional guide rails 51. A plurality of elongated slots 52 formed in plate 50 permit it to be assembled over push buttons 21. A spring tensioned blade member 53 extends across one end of each slot 52 and is adapted to register with a groove 54 formed in each push button 21.

Slots 52 are of sufficient length to permit lock plate 50 to move sufficiently to enable blades 53 to be clear of grooves 54 in an unlocked position and a spring 56 as shown in FIG. 4 is utilized to bias plate 50 into a locked position, where blades 53 engage with their respective grooves 54 in buttons 21, thereby holding all buttons 21 particularly against axial movement in their fully extended positions.

A timing device 57 is adapted to remove and subsequently re-insert a locking pin 58 through plate 50 and retaining plate 33, both of which have suitable holes which are of course, in axial alignment upon plate 50 being in its locked position as described. Device 57 is preset to maintain the retraction of pin 57 for a required time and the operation thereof is initiated by the operation of handle 25.

Locking plate 50 is connected mechanically to the moving portion of a solenoid 59, suitable switching means 61 placing solenoid 59 in an electrical circuit simultaneously with the removal of locking pins 58 from plate 50. Solenoid 59 is sufficiently strong to overcome spring 56 and move plate 50 into the unlocked position preparatory to the interviewee making a choice.

Referring also to FIG. 7, upon the button 21 indicating the desired answer being depressed, the vote is recorded on the appropriate mechanical counter 30 and by simultaneously closing its switch 36 the circuit including motor 38 and indicator lamps 23 is energized, a solenoid operated circuit breaker 60 is activated, the solenoid being included in the said circuit, while the circuit breaker is connected in series with solenoid 59. Thus depression of any button 21 results in solenoid 59 being de-energized so that spring 56 is able to return plate 50 to its locked position. The blade 53 of the slot 52 surrounding the depressed button 21 is caused to retract while all the remainder of the blades 53 enter the grooves 54 of their respective buttons 21. Removal of digital pressure from the depressed button 21 permits it to extend and the previously retracted blade 53 enters its groove 54 to maintain this particular button also in a locked position in common with the remainder of buttons 21.

In this manner, all buttons 21 are locked upon a vote being recorded and remain locked for the same period of time that the lamps 23 and graph 22 are operating.

Upon timer 42 breaking the lamp and motor circuit as described, circuit breaker 60 is returned to its normal state and solenoid 59 is again activated to move plate 50 to its unlocked position in preparation for answering the next question.

Upon expiration of the time alloted by timer 57, the circuit containing solenoid 59 is broken and plate 50, under the influence of spring 56, is moved into the locked position with all blades 53 registering with all their respective grooves 54 in buttons 21; pin 58 passes through plate 50 and machine 10 is therefore fully locked against inadvertent or malicious operation. Operation of handle 25 again resets timer 57 to the predetermined time and the complete answering cycle as described may thereafter be repeated.

FIGS. 4, 5 and 6 also illustrate a small generator 65 which is driven through a ratchet drive mechanism and standard gears each time handle 25 is operated. Electrical power generated in this manner is stored in a storage battery 66 which is conveniently located within casing 11 and which may be utilized to operate the electrical portion of the action of machine 10 in the absence of an external power supply.

Referring particularly to FIGS. 2, 3 and 8 a block-out device 70 is located adjacent each push button 21, the object of the device being to hold its relevant button 21 in its fully depressed position and to isolate the contacts 36 and 36b of the relevant switch 36. In order to achieve this action each push button 21 includes a second slot 71; a locking member 72 in the form of a quadrantal plate or a pin may be selectively inserted or removed from slot 71 to either hold button 21 down or to permit it free travel. Simultaneously with button 21 being held down by member 72, a thin dielectric plate 73 is inserted between the contacts 36a and 36b of switch 36. Member 72 and plate 73 are attached to a vertical shaft 74 suitably supported in a guide 75 on the bottom wall of case 11 at its lower end and by retaining plate 33 at the upper end. Shaft 74 terminates in a selector button 76 located adjacent its relevant button 21 and the method of insertion and removal of member 72 and plate 73 may be either by rotation of shaft 74 by button 76, or by having guide 75 elongated and retaining plate 33 suitably slotted to permit selector button 76 to be pushed across the surface of plate 33.

Locking plate 50 is also suitably slotted to allow sufficient clearance between it and shafts 74 during its locking and unlocking operation.

Referring to FIG. 9 a questionnaire sheet 77 bearing the required questions and choice of answers on its upper surface to register with the relevant apertures 14, 17 and 18 in lid 12 and having a plurality of holes 78 formed therethrough to permit its assembly over buttons 21, is located on a similarly perforated blocking out sheet 79, both sheets 77 and 79 thereafter being placed on the upper surface of plate 33 and held in position by lid 12.

A plurality of raised portions 80 are attached to the upper surface of blocking out sheet 79, portion 80 corresponding in size, shape and number of apertures 14, 17 and 18, so that upon, say, a question requiring only two alternative answers the third aperture which would otherwise show a piece of blank paper, is blanked out by the corresponding portion 80, the questionnaire 77 being suitably cut away as at 81 to allow portion 80 to show through.

In this instance it will follow that the corresponding button 21 will also be blocked out in the manner described in FIG. 8, so that upon the upper surface of button 21 and the portion 80 being of similar colour and general appearance to the upper surface of lid 12, an apparently unbroken surface is present to the eye and should therefore be ignored by the interviewee.

The embodiments of this invention in which an exclusive property or privilege is claimed are defined as follows:

1. A market research machine including a box like body member having a lid; a retaining plate inside said body member extending thereacross in a plane substantially parallel with said lid upon said lid being closed; at least one counting device attached to said retaining plate; a resilient upwardly biased push button for operating said counting device extending outwardly therefrom; said lid being apertured to permit said push button to extend therethrough and to be freely movable axially therein; electrical switch means operable by said push button; relay switch means operable by said electrical switch; an electric motor and electric lamp means connected in parallel with each other and in series with said relay switch; an electrical timing device connected in series with said relay switch; said timing device permitting the electrical circuit containing said relay switch, said motor, said lamps and said timing device to operate for a predetermined length of time before temporarily breaking said circuit; rotatable display means operable by said motor; a questionnaire sheet having data inscribed on the upper surface thereof installed between said retaining plate and said lid; and said lid having further apertures therethrough to permit said data to be viewed from the outside of said body member.

2. A market research machine as defined in claim 1 including a plurality of said counting devices and associated push buttons; locking means for automatically holding said push buttons in their fully extended positions; and a second electrical relay means connected in parallel with said motor and in series with said relay switch to activate said locking means upon depression of any one of said buttons.

3. A market research machine as defined in claim 1 including a plurality of said counting devices and associated push buttons; locking means for automatically holding said push buttons in their fully extended positions; and a second electrical relay means connected in parallel with said motor and in series with said relay switch to activate said locking means upon depression of any one of said buttons; said locking means comprising an apertured flat plate fitting over said buttons in a plane parallel with said retaining plate and transversely slidable in relation thereto; a spring tensioned blade member extending across each of said apertures in said flat plate; resilient means biasing said plate to force said blade member onto said buttons; said buttons being grooved to slidably receive said blade members upon said buttons being in their fully extended state; electrical solenoid means operable by said second electrical relay; mechanical connection means between the moving portion of said solenoid and said flat plate holding said plate away from said push button against said resilient means upon being energized and permitting said plate to move toward said buttons upon becoming de-energized; said second electrical relay being adapted to break a second circuit to said solenoid upon becoming energized with the operation of said first relay switch; and to remake said second circuit upon becoming de-energized.

4. A market research machine as defined in claim 1; a display cylinder axially rotatable and supported by said retaining plate; said cylinder having at least one end wall; a resilient drive belt driven by said motor and supported by pulley means; one of said pulleys holding said belt in pressural contact with said end wall and off centre therewith so that lineal travel of said belt results in rotation of said cylinder.

5. A market research machine as defined in claim 1 including a frame extending outwardly from said body member and being retractably attached thereto, for the support of message bearing cards.

6. A market research machine as defined in claim 1 including a block out device associated with each of said push buttons comprising shaft means; a quadrantal plate extending outwardly from said shaft; said push button being grooved to selectively receive said quadrantal plate upon said push button being fully depressed and said shaft being suitably moved; and a dielectric plate attached to said shaft and operable in unison with said quadrantal plate to extend between the contacts of the relevant switch normally operable by said depressed button.

7. A market research machine as defined in claim 1 including a block out device associated with each of said push buttons comprising shaft means; a quadrantal plate extending outwardly from said shaft; said push button being grooved to selectively receive said quadrantal plate upon said push button being fully depressed and said shaft being suitably moved; and a dielectric plate attached to said shaft and operable in unison with said quadrantal plate to extend between the contacts of the relevant switch normally operable by said depressed button; a blocking out sheet; a plurality of raised portions on the upper surface of said sheet corresponding to said second set of apertures in said lid and being extendable through said questionnaire sheet, upon said sheet being apertured, to preset a substantially unbroken view of the upper surface of said lid in the vicinity of said apertured portion of said sheet.

No references cited.

MALCOLM A. MORRISON, *Primary Examiner*.